United States Patent Office 3,342,803
Patented Sept. 19, 1967

3,342,803
WATER-INSOLUBLE MONOAZO-DYESTUFFS
Klaus Artz, Muttenz, and Paul Rhyner, Basel, Switzerland, assignors to Ciba Limited, Basel, Switzerland, a Swiss company
No Drawing. Filed Jan. 23, 1964, Ser. No. 339,817
Claims priority, application Switzerland, Feb. 21, 1963, 2,204/63
6 Claims. (Cl. 260—207)

The present invention provides new, valuable water-insoluble monoazo dyestuffs of the formula (1)
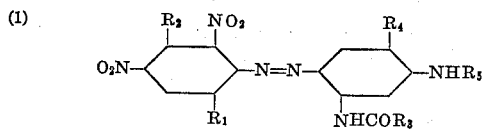

in which $R_1$ represents a hydrogen or a halogen atom or an alkoxy, alkyl or trifluoromethyl group, $R_2$ represents a hydrogen or a halogen atom or an alkyl, trifluoromethyl or alkoxy group, $R_3$ represents a hydrogen atom or an alkyl, alkoxy or cycloalkyl group that may be substituted, or a benzene radical that may be substituted, $R_4$ represents a hydrogen atom or an alkyl or alkoxy group, and $R_5$ represents a cyanoalkoxyalkyl group or an acyloxyalkyl group.

The new dyestuffs are obtained when a diazo compound of an amine of the formula (2)
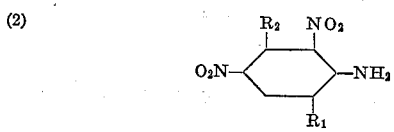

is coupled with a coupling component of the formula (3)
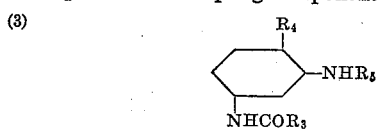

in which formulae $R_1$, $R_2$, $R_3$, $R_4$ and $R_5$ have the meanings given above.

The following amines are examples of suitable diazo components:

2:4-dinitroaniline,
2:4-dinitro-6-chloro- or bromo-aniline,
2:4-dinitro-6-methylaniline,
2:4-dinitro-3:6-dichloraniline, and
2:4-dinitro-3-trifluoromethyl-6-chloraniline.

In the amines of the Formula 3 to be used as coupling components, $R_3$ may represent an alkyl or alkoxy group, for example, a methyl, ethyl, propyl, butyl or cyclohexyl group or a substituted alkyl group, as, for example, a chloromethyl, a methoxymethyl or an unsaturated alkyl group such as a vinyl or a propylene group. $R_3$ may also represent a hydrogen atom or an alkoxy group, for example, a methoxy, ethoxy or β-chlorethoxy group. $R_5$ advantageously represents a cyanoethoxyalkyl group, in which the alkyl group may contain one or more cyano-ethoxy groups, for example, two cyanoethoxy groups. In addition to a cyanoethoxy group, the alkyl group may contain other substituents, for example, halogen atoms. $R_5$ may also represent an acyloxyalkyl group, advantageously an aliphatic acyloxyalkyl group, for example, an acetoxyethyl, a propionoxyethyl group or a butyryloxyethyl group. For example, $R_5$ may represent the following:

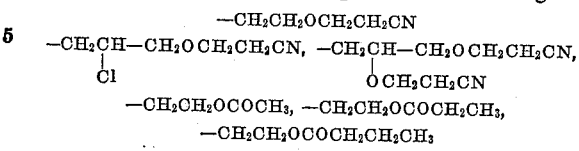

The following are examples of coupling components:

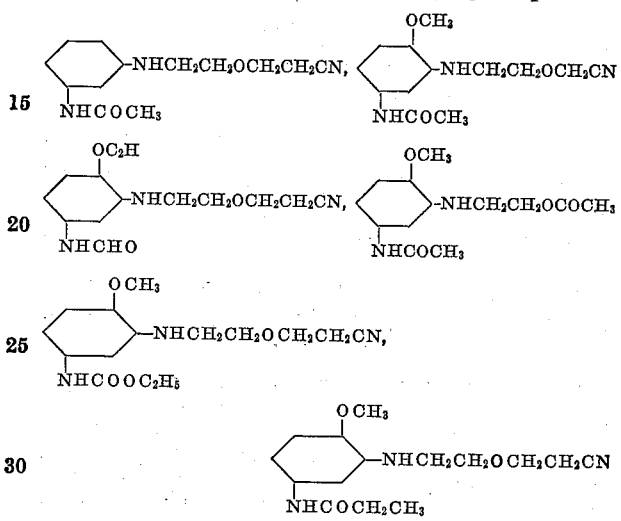

The above-mentioned coupling components may be obtained by additively combining 1 mol of acrylonitrile with the appropriate hydroxyethylaniline in the presence of a base, or by reacting 1 mol of an appropriate hydroxyethylaniline with 1 mol of an aliphatic carboxylic acid halide or anhydride.

The diazotization of the aforementioned diazo components may be carried out by known methods, for example, by means of a mineral acid, especially hydrochloric acid, and sodium nitrite or, for example with a solution of nitrosylsulfuric acid in concentrated sulfuric acid.

The coupling operation may also be carried out by known methods, for example, in a neutral to acid medium, if desired or required, in the presence of sodium acetate or similar buffers or catalysts that influence the rate of coupling, for example, pyridine or salts thereof.

When the coupling reaction is finished, the dyestuffs formed can be isolated from the coupling mixture, for example, by filtration because they are virtually insoluble in water.

Instead of a single diazo component, a mixture of two or more of the diazo components of the invention may be used and, instead of a single coupling component, a mixture of two or more of the coupling components the invention may also be used, or a mixture comprising one of the said coupling components and a bis-(cynaoalkoxy-alkyl)-aniline or a bis-(acyloxyalkyl)-aniline, for example, a mixture of amines of the formulae (4)
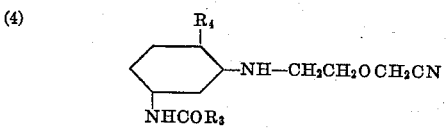

(5)

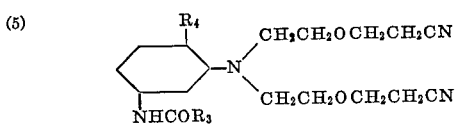

After conversion into a finely dispersed form, the new monoazo dyestuffs are eminently suitable for dyeing synthetic fibers, especially fibers made of aromatic polyesters. Deep reddish blue to greenish blue dyeings are obtained that exhibit a good fastness to light and sublimation. The new dyestuffs also reserve well on wool.

The new dyestuffs can also be used with advantage in admixture with other dyestuffs, especially with dyestuffs of the formula

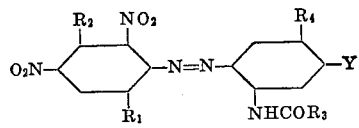

in which $R_1$, $R_2$, $R_3$ and $R_4$ have the meanings given above, and Y represents a bis-(cyanoalkoxyalkyl)-amino group or a bis-(acyloxyalkyl)-amino group.

Compared with the dyestuffs described in French specification No. 1,261,580, the dyestuffs obtained by the process of the invention are distinguished by better properties of fastness. Moreover, they show good affinity for polyester fibers when applied from an alkaline bath, and they reserve wool better.

The following examples illustrate the invention. Unless otherwise stated, the parts and percentages are by weight.

*Example 1*

1.8 parts of 2:4-dinitroaniline was introduced, at 0 to 5° C., into 20 parts of concentrated sulfuric acid in which 0.7 part of sodium nitrite had been dissolved, the whole was stirred at that temperature for 1 hour and then discharged on to ice. 2.8 parts of 2-methoxy-5-acetylamino-N-(β-cyanoethoxylethyl)-aniline, dissolved in 100 parts of 2 N hydrochloric acid, were poured into the solution. The dyestuff of the formula

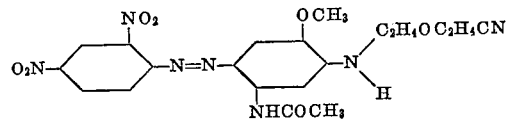

was precipitated by the addition of saturated sodium acetate solution and then isolated by suction filtration. The dyestuff thus obtained yielded blue dyeings possessing good properties of fasteness when applied to polyester fibers in the form of an aqueous dispersion.

The above-mentioned coupling component was obtained by additively combining acrylonitrile with 2-methoxy-5-acetamide-N-(hydroxyethyl)-aniline in the presence of a base, or by reacting 2-methoxy-5-acetylamino-aniline with 1 mol of β-chlorethyl-β-cyanoethyl ether.

The dyestuff obtained as described in the first paragraph could also be used with advantage in admixture with one of the following dyestuffs, for example, in a ratio of 1:1:

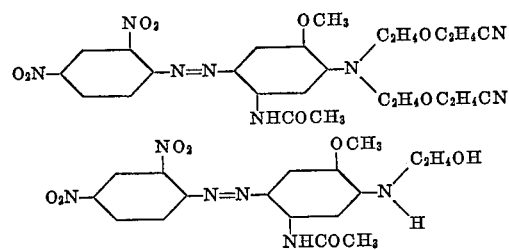

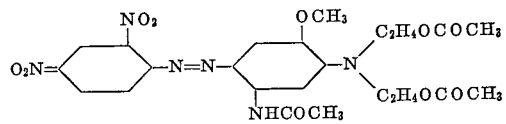

Blue dyeings possessing good properties of fastness were likewise obtained on polyester fibers.

*Example 2*

2:2 parts of 2:-dinitro-6-chloroaniline were introduced, at 0 to 5° C., into 20 parts of concentrated sulfuric acid in which 0.7 part of sodium nitrite had been dissolved, the whole was stirred at that temperature for 1 hour and then discharged on to ice. 2. parts of 2-methoxy-5-acetyl-amino-N-(β-cyanoethoxyethyl)-aniline, dissolved in 100 parts of 2 N hydrochloric acid, were poured into the solution. The dyestuff of the formula

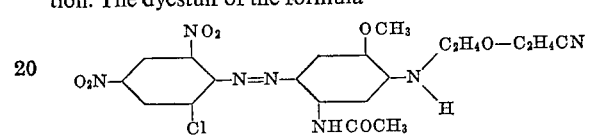

was precipitated by the addition of saturated sodium acetate solution and then isolated by suction filtration. The dyestuff thus obtained yielded blue dyeings possessing good properties of fastness when applied to polyester fibers in the form of an aqueous dispersion.

By using 2.5 parts of 2:4-dinitro-6-bromoaniline instead of 2:4-dinitro-6-chloroaniline, a dyestuff having very similar dyeing properties was obtained.

The dyestuff obtained as described in the first paragraph may also be used with advantage in admixture with one of the following dyestuffs, for example, in a ratio of 1:1:

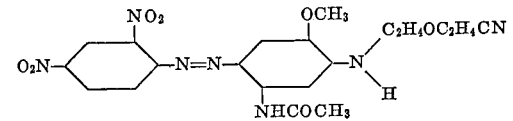

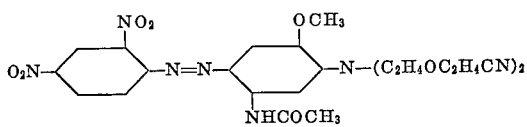

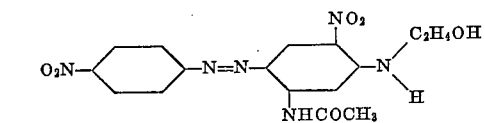

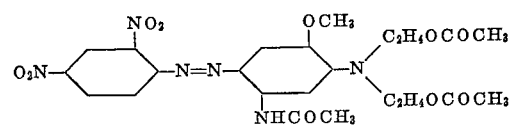

*Example 3*

1.8 parts of 2:4-dinitroaniline were introduced, at 0 to 5° C., in 20 parts of concentrated sulfuric acid in which 0.7 part of sodium nitrite had been dissolved, the whole was stirred for 1 hour and then discharged on to ice. 2.7 parts of 2-methoxy-5-acetylamino-N-(acetoxyethyl)-aniline, dissolved in 100 parts of 2 N hydrochloric acid, were poured into the solution. The dyestuff of the formula

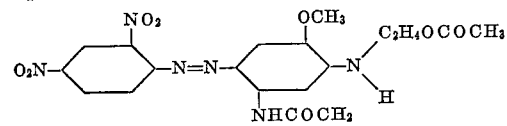

was precipitated by the addition of saturated sodium acetate solution and then isolated by suction filtration. The dyestuff thus obtained yielded blue dyeings possessing good properties of fastness when applied to polyester fibers in the form of an aqueous dispersion.

The above-mentioned coupling components could be obtained by acylating 2-methoxy-5-acetylamino-N-(hydroxyethyl)-aniline or by reacting 2-methoxy-5-acetylaminoaniline with 1 mol of acetic acid—β-chlorethylester.

The dyestuff obtained in the manner described in the first paragraph could also be used with advantage in admixture with one of the following dyestuffs, for example, in a ratio of 1:1:

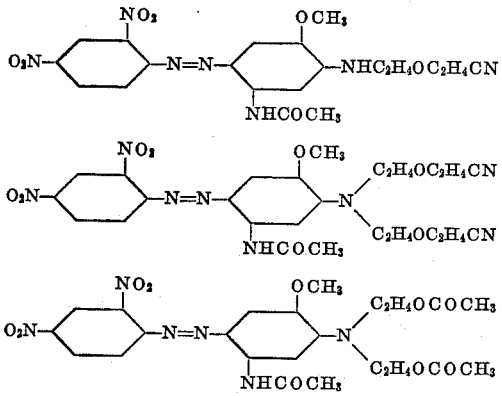

Blue dyeings possessing good properties of fastness were likewise obtained on polyester fibers.

The following table contains further dyestuffs characterized by the substituents $R_1$, $R_2$, $R_3$, $R_4$ and $R_5$ as above defined and which were prepared in a manner analogous to that described in the above examples.

| No. | $R_1$ | $R_2$ | $R_3$ | $R_4$ | $R_5$ | Tints on polyester fibers |
|---|---|---|---|---|---|---|
| 1 | —H | —H | —$CH_2$—$CH_3$ | —$OCH_3$ | —$C_2H_4$—O—$C_2H_4CN$ | Reddish blue. |
| 2 | —H | —H | —$(CH_2)_2CH_3$ | —$OCH_3$ | —$C_2H_4$—O—$C_2H_4CN$ | Do. |
| 3 | —H | —H | —$CH(CH_3)_2$ | —$OCH_3$ | —$C_2H_4$—O—$C_2H_4CN$ | Do. |
| 4 | —H | —H | —$CH_3$ | —$OC_2H_5$ | —$C_2H_4$—O—$C_2H_4CN$ | Do. |
| 5 | —H | —H | —$CH_2CH_3$ | —$OC_2H_5$ | —$C_2H_4$—O—$C_2H_4CN$ | Do. |
| 6 | —H | —H | —$(CH_2)_2CH_3$ | —$OC_2H_5$ | —$C_2H_4$—O—$C_2H_4CN$ | Do. |
| 7 | —H | —H | —$CH(CH_3)_2$ | —$OC_2H_5$ | —$C_2H_4$—O—$C_2H_4CN$ | Do. |
| 8 | Cl | —H | —$CH_2CH_3$ | —$OCH_3$ | —$C_2H_4$—O—$C_2H_4CN$ | Greenish blue. |
| 9 | Cl | —H | —$(CH_2)_2CH_3$ | —$OCH_3$ | —$C_2H_4$—O—$C_2H_4CN$ | Do. |
| 10 | Cl | —H | —$CH(CH_3)_2$ | —$OCH_3$ | —$C_2H_4$—O—$C_2H_4CN$ | Do. |
| 11 | Cl | —H | —$CH_3$ | —$OC_2H_5$ | —$C_2H_4$—O—$C_2H_4DN$ | Do. |
| 12 | Cl | —H | —$CH_2CH_3$ | —$OC_2H_5$ | —$C_2H_4$—O—$C_2H_4CN$ | Do. |
| 13 | Cl | —H | —$(CH_2)_2CH_3$ | —$OC_2H_5$ | —$C_2H_4$—O—$C_2H_4CN$ | Do. |
| 14 | Cl | —H | —$CH(CH_3)_2$ | —$OC_2H_5$ | —$C_2H_4$—O—$C_2H_4CN$ | Do. |
| 15 | Br | —H | —$CH_3$ | —$OCH_3$ | —$C_2H_4$—O—$C_2H_4CN$ | Do. |
| 16 | Br | —H | —$CH_3$ | —$OC_2H_5$ | —$C_2H_4$—O—$C_2H_4CN$ | Do. |
| 17 | —$CH_3$ | —H | —$CH_3$ | —$OCH_3$ | —$C_2H_4$—O—$C_2H_4CN$ | Reddish blue. |
| 18 | —$C_2H_5$ | —H | —$CH_3$ | —$OCH_3$ | —$C_2H_4$—O—$C_2H_4CN$ | Do. |

*Example 4*

1 part of an aqueous paste of the dyestuff obtained as described in Example 1 and approximately 1 part of dried sulfite cellulose waste liquor were ground in a roller mill to form a fine paste having a dyestuff content of approximately 10%.

100 parts of fibrous material made of polyethylene terephthalate were washed for half an hour in a bath containing 1 to 2 parts of the sodium salt of N-benzyl-μ-heptadecyl-benzimidazole disulfonic acid and 1 part of concentrated aqueous ammonia solution per 1000 parts of water. The material was then entered into a dyebath comprising 3000 parts of water to which 1.5 parts by volume of 80% acetic acid had been added and in which 10 parts of the dyestuff paste obtained as described in the first paragraph had been dispersed in the presence of 54 parts of the sodium salt of N-benzyl-μ-heptadecyl benzimidazole disulfonic acid. The whole was heated to 130° C. in a pressure vessel and kept at that temperature for 1 hour. The material was then well rinsed and, if desired or required, washed for half an hour at 60 to 80° C. with a solution containing 1 part of the sodium salt of N-benzyl-μ-heptadecyl benzimidazole disulfonic acid for 1000 parts of water. A blue dyeing possessing good properties of fastness was obtained.

What is claimed is:
1. A monoazo-dyestuff of the formula

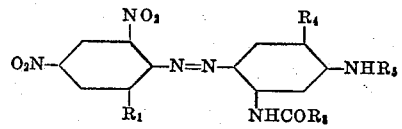

in which $R_1$ represents a member selected from the group consisting of hydrogen, chlorine, bromine and lower alkyl. $R_3$ represents lower alkyl, $R_4$ stands for a member selected from the group consisting of hydrogen, lower alkyl and lower alkoxy and $R_5$ represents a member selected from the group consisting of cyanoethoxyethyl and ethyl loweralkanoyloxy-ethyl.

2. A monoazo dyestuff of the formula

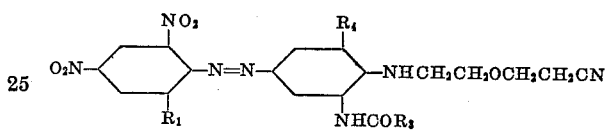

in which $R_1$ represents a member selected from the group consisting of hydrogen, chlorine, bromine and lower alkyl. $R_3$ represents lower alkyl, $R_4$ stands for a member selected from the group consisting of hydrogen, lower alkyl and lower alkoxy.

3. The dyestuff of the formula

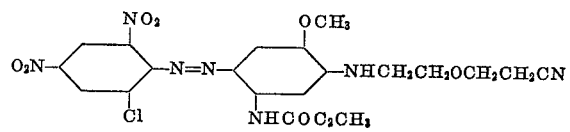

4. The dyestuff of the formula

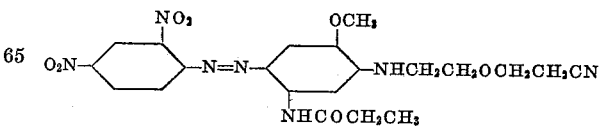

5. The dyestuff of the formula

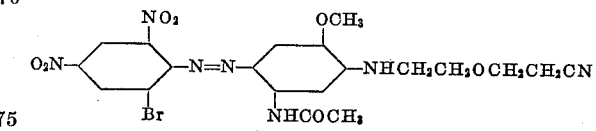

6. The dyestuff of the formula
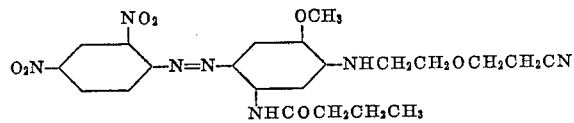
References Cited
UNITED STATES PATENTS
3,178,405 4/1965 Merian _____ 260—207
FOREIGN PATENTS
856,348 12/1960 Great Britain.
CHARLES B. PARKER, *Primary Examiner.*
F. D. HIGEL, *Assistant Examiner.*

UNITED STATES PATENT OFFICE
CERTIFICATE OF CORRECTION

Patent No. 3,342,803                        September 19, 1967

Klaus Artz et al.

It is hereby certified that error appears in the above numbered patent requiring correction and that the said Letters Patent should read as corrected below.

Column 6, lines 56 to 60, for that portion of the formula reading

Signed and sealed this 21st day of January 1969.

(SEAL)
Attest:

Edward M. Fletcher, Jr.
Attesting Officer

EDWARD J. BRENNER
Commissioner of Patents